United States Patent [19]

Anstett et al.

[11] 4,357,862
[45] Nov. 9, 1982

[54] APPARATUS FOR THE CONTINUOUS PRODUCTION OF FRIED DOUGH CRUSTS

[75] Inventors: David N. Anstett, Duluth, Minn.; Egbert W. Volkert, Poplar, Wis.; Richard F. Schryer, Duluth, Minn.

[73] Assignee: Jeno's, Inc., Duluth, Minn.

[21] Appl. No.: 281,061

[22] Filed: Jul. 7, 1981

Related U.S. Application Data

[62] Division of Ser. No. 127,238, Mar. 4, 1980, Pat. No. 4,308,286.

[51] Int. Cl.³ .............................................. A47J 37/12
[52] U.S. Cl. ...................................... 99/355; 99/405; 426/438
[58] Field of Search .................. 99/353, 355, 404, 405, 99/407, 443 C; 426/438, 439, 94, 95, 502, 391

[56] References Cited

U.S. PATENT DOCUMENTS

| | | | |
|---|---|---|---|
| 1,760,979 | 6/1930 | Ferry | 99/405 |
| 2,907,268 | 10/1959 | Doolin | 99/404 |
| 3,309,981 | 3/1967 | Benson et al. | 99/405 |
| 3,338,154 | 8/1967 | Camacho | 99/353 |
| 3,379,141 | 4/1968 | Groth | 426/502 |
| 3,520,248 | 7/1970 | MacKendrick | 99/353 |
| 3,608,474 | 9/1971 | Liepa | 99/404 |
| 3,615,678 | 10/1971 | Tangel | 426/94 |
| 3,680,474 | 8/1972 | Brown | 99/353 |
| 3,693,533 | 9/1972 | Liepa | 99/404 |
| 3,722,400 | 3/1973 | Jimenez | 99/353 |
| 3,763,764 | 10/1973 | Schy | 99/353 |
| 3,861,289 | 1/1975 | Baker | 99/404 |
| 3,880,069 | 4/1975 | Moline | 99/483 |
| 3,966,983 | 6/1976 | Dexter | 426/439 |
| 4,046,920 | 9/1977 | Moline | 426/391 |
| 4,126,706 | 11/1978 | Hilton | 426/438 |
| 4,154,153 | 5/1979 | Stickle | 99/404 |
| 4,170,659 | 10/1979 | Totino | 426/95 |
| 4,184,418 | 1/1980 | Jimenez | 99/353 |
| 4,187,771 | 2/1980 | Westover | 99/404 |
| 4,208,441 | 6/1980 | Westover | 99/386 X |

FOREIGN PATENT DOCUMENTS

1016011 8/1977 Canada .............................. 426/439

*Primary Examiner*—Billy J. Wilhite
*Attorney, Agent, or Firm*—J. Gibson Semmes; Patrick H. Hume; Joseph Shortill

[57] ABSTRACT

Apparatus for the continuous production of fried dough crusts is disclosed in which the dough pieces are retained between a pair of endless conveyors, one above the other, the upper conveyor being of balanced-weave construction, the lower conveyor being of flat-flex construction, the designs of said conveyors being incapable of registering with one another. The endless conveyors traverse a part of a hot oil bath, beneath the surface of the oil in uniform, spaced, parallel relation to each other, the spacing between the conveyors being maintained within the range of ⅛ inch to ⅜ inch for confinement of the dough pieces therebetween. The oil in the cooking zone of said bath is maintained at a temperature range of about 360°–410° F. After exiting from the cooking bath and prior to reaching a delivery point, crusts are continuously confined and rapidly cooled.

2 Claims, 6 Drawing Figures

APPARATUS FOR THE CONTINUOUS PRODUCTION OF FRIED DOUGH CRUSTS

This is a divisional of application Ser. No. 06/127,238, filed March 4, 1980 now U.S. Pat. No. 4,308,286.

BACKGROUND OF INVENTION

1. Field of Invention

An improved apparatus of the type most commonly used to produce fried dough crust, as a shell for pizza toppings, is disclosed. Such a shell is especially suited after it has been cooked, filled and frozen, for long-term storage, whereby the customer may purchase it frozen, store it in the frozen state, and prepare it by baking for a very short time. Such products are popular in today's market-place, as they may be purchased prepackaged, ready for serving, except for the final baking that is undertaken immediately before serving. Characteristics of the product as a pizza crust will be more fully explained hereinafter, noting only that it is believed to be the most durable such product, resistant to excessive delamination during and after frying, and to have, by virtue of control in formulation and method, a relative lack of greasiness, and most pleasing consistency and taste of any similar commercial products.

2. Description of the Prior Art

The known art is best represented by the patents to Moline, U.S. Pat. No. 3,880,069 and Totino, U.S. Pat. No. 4,170,659. Within the baking art, such as is indicated by Moline, it has, heretofore, been thought essential to dock, or perforate, a given raw dough sheet before cooking by baking, the essential purpose being to insure that the dough sheet may "breathe" during the cooking process, thereby to exhaust excessive water vapor, and other gases, created during the cooking process, which, if not exhausted, would result in an uneven shell having excessively sized and frangible hollow portions, or blisters, between the surfaces of the dough piece. To the same or greater extent, a problem is presented in frying a dough piece, as in the Totino process. Here it was argued that docking per se was essential to prevent delamination of the crust. Totino called for the spaced apart holes, penetrating all the way through the dough sheet, at least some of which are located in "ligaments": those holes being fried hard to provide "rivet-like bonds" between upper and lower surfaces. Whereas, Totino taught that "ligaments" were the primary means for preventing delamination, the secondary, but essential, means was said to include the rivet effect occasioned by the coincidence of the docking perforations with the ligaments. There are no perforations, nor is any docking attempted, in the production of the within product, as will appear hereinfter.

SUMMARY OF THE INVENTION

It is the primary object of the invention to produce a crust that has increased volume (vertical depth or thickness) for visual and taste appeal, a relatively greaseless, crispy but tender texture, and a fried flavor, as compared to the flavor of a baked product.

Another object is to prepare such a crust having optimum partial delamination positively controlled in a continuous and uniform manner.

Yet another object of the invention is to achieve the foregoing objectives without docking (perforating) the sheet in avoidance of the recognized disadvantages entailed in doing so in producing the product, and in the product itself.

A further object is to confine dough of a preferred formulation between closely spaced, reticular forms, while exposed to cooking heat, so that the upper and lower layers of the dough are held closely together at random intervals to become homogeneously bonded together during cooking into a stable, integrated mass of relatively solid, nonlaminated character, with partial lamination of the layers occuring in a preselected, controlled manner between such bonded intervals.

Still a further object contemplates novel means for giving effect to salient points in the method for the production of a superior crust.

Other objects and advantages will become apparent by reference to the appended drawings, specifications and claims.

Attainment of the foregoing objectives became possible only after answers could be found to the many problems that arose during the course of the empirical development, which problems had to be identified in order to be solved. The following outline is illustrative of the basic considerations involved:

I. DEVELOPMENT OF A CRUST WITH INCREASED VOLUME

A. Submersion Frying
  1. Crust delamination resulting from submersion frying
    a. Due to the rapid penetration of heat into the crust during submersion frying, much leavening or expansion of gas cells in the dough piece is produced
    b. This rapid increase in gas cell size in the dough is attributed to:
      (1) The expansion of the gas in the gas cells as the gas is heated by the hot frying oil;
      (2) The production of steam from water in the dough formulation as it is heated to the boiling point during submersion frying;
    c. Both (1) and (2), above, result in a very rapid expansion of the dough starting from 10 to 15 second into the frying cycle
      (1) Delamination is the result of this rapid growth in cell size if the expansion is not controlled;
      (2) Small gas cells in proximity expand rapidly until the membrane of dough between the cells ruptures and produces a single larger gas cell;
      (3) This coalescing of expanding gas cells continues producing ever larger gas cells;
      (4) Total delamination occurs as the gas cells expand and coalesce to form one large gas cell whose outer membrane is the exterior surface of the dough piece.
B. Delamination Is an Undesirable Characteristic When Allowed to Run Its Natural Course
  1. The resulting fried dough pieces are irregular in size
  2. The delaminated surfaces will not hold their volume due to the delicate nature of the fried dough shell and will collapse leaving a thin flat crust without the desired increase in volume
  3. Using the delaminated crust for frozen products that are reheated by the consumer results in an even more fragile crust that crumbles and fragments when the crust is cut after reheating
C. Controlling the Degree of Gas Cell Expansion 1. Formulation can be used to help control the rate of expansion
   a. Water can be increased or decreased to control the amount of steam generated during frying
   b. Amounts of yeast can be increased or decreased to control the size and number of the gas ($CO_2$) cells before the dough piece is fried
   c. Chemical leavening can be added to regulate the amount and timing of gas ($CO_2$) formation
2. Dough handling procedures can be changed to help regulate yeast and chemical leavening, i.e., carbon dioxide ($CO_2$) production
   a. Dough temperatures can be increased or decreased to regulate yeast and chemical leavening, i.e. carbon dioxide ($CO_2$) production
   b. The time between mixing of the dough and sheeting of the dough can be increased or decreased to allow more or less time for gas cell development. The dough can be proofed to increase gas cell development or cooled to limit gas production
3. The dough expansion can be restricted by submersion frying between two fryer chains for more positive mechanical control of bubble development

II. SUBMERSION FRYING WITH POSITIVE MECHANICAL REGULATION OF BUBBLE DEVELOPMENT

A. Positive Control of Bubble Development Was Produced by Using Various Types of Fryer Belting Materials
   1. The degree of delamination is regulated by the design of the top and bottom fryer chains and the distance between the chains during the fry
      a. Belting materials vary in their design, so that at the outset it is essential to select a belting material that will produce the desired pattern of bubble development on the top and bottom dough surfaces during the fry
         (1) The distance between the strands of the wire weave or the closeness of the strands of the weave will determine bubble size and height during the fry;
         (2) Relatively close distances between wire strands will allow the bubble of dough to expand into the weave only a short distance, due to the increased number of strands in contact with the dough restricting expansion in the vertical dimension (i.e., limiting the volume of the dough piece);
         (3) Larger distances between wire strands allow for the bubble to expand further into the weave forming a bubble with a larger diameter and height;
         (4) Therefore, the diameter and height of the bubble can be readily determined by the design of belting material used. Many patterns of bubble development are possible with this method of controlling dough expansion;
      b. The spacing between the top and bottom fryer chains is critical
         (1) This spacing has a direct relationship to the degree of delamination;
         (2) By regulating the spacing between the chains during the fry, it is possible to attain a "controlled delamination";
         (3) A close spacing between the top and bottom chains will allow for the strands of the top chain to hold the dough in close proximity to the strands of the bottom chain at random spaced intervals marked by cross-points to prevent the two dough surfaces from delaminating;
         (4) As the dough is fried, the cross-points where the dough is in restraint provide homogeneous bonds between the top and bottom crusts that give strength to maintain crust volume after frying;
         (5) The number of cross-points selected is determined by the spacing between belts and the design of the top and bottom belts. Belts with more strands per inch will result in more cross-points and less dough or crust volume;
         (6) In actual use, chain spacing of from $\frac{1}{8}''$ to $\frac{3}{8}''$ is most effective with limited effect from $\frac{3}{8}''$ to $\frac{1}{2}''$ is not effective;
         (7) Dough scaling weight will also influence the effective chain spacing. A high scaling weight will tend to have more internal dough for cross-points formation and may be fried at a slightly greater chain spacing than a lower scaling weight
            No effort is made to match prominences on the upper and lower belts into vertical confrontation (i.e., cross-points), inasmuch as this renders the resulting crust pattern too stereotyped, and renders the product undesirable as to texture and appearance. A random pattern on the crust fried between submersion belts, having 3/16" clearance between them, is preferred.
            The products are held in confinement between exiting conveyor belts until well after emerging from the hot oil bath. Hot oil adheres to the products upon withdrawal from the bath proper. Cooking conditions which are maintained by this adherent hot oil, would result in delamination of the products if confinement were not also maintained until the product is cooled below the point at which internally trapped gas stops expanding and begins to shrink. The confined crusts are then conducted by the existing conveyor system to a point of release, just before which, an air blast is delivered by nozzle means. The positioning of said nozzle means is such that the delivered air blast cools the products sufficiently to arrest further expansion, while, at the same time, effectively blowing away the surface oil still adherent to the products. The air blast serves as a mechanical stripping means by which the crusts are stripped from the existing upper conveyor and delivered to the next handling station.
B. Method for Positive Control of Bubble Development of Dough Products During Frying
   1. This method provides a means for producing fried dough products with random bubble patterns of a controlled height
      a. The resulting product is partially fried leaving a thin, crispy but flexible exterior surface
      b. The interior of the product has a soft, porous structure with a large number of cavities of bubbles, supported by the crispness of the outerfried surfaces of the bubbles, and the homogeneous bonds, defining "supporting cross members", formed during the frying process (1) The dough must be fried to create a thin, crispy exterior that is firm enough to prevent collapsing of the cavities in the crust as it is cooled and processed but is not completely fried so that the reheated product, such as a pizza crust, will subsequently bake to a medium brown color without excessive crispness or fragility;

(2) The frying time-temperature ratio is controlled to give the desired level of crispness in the finished product.

c. The crusts produced by this method have a much greater volume than a crust baked using conventional means d. During the frying process, the moisture from formulation, that is lost from the dough as steam, is partially replaced by the hot frying shortening. This absorption of fat contributes to a desirable change in crust flavor over a conventional baked crust.

EXAMPLE

Step I

An appropriately formulated dough was compounded in a horizontal mixer.

Step II

The compounded dough is maintained at 80°-90° F. while held in a lightly oiled trough for two to five to fifteen minutes depending upon ambient room temperatures. Holding time is optimized to produce desired degree of gas production from faster reacting chemical leaveners and slower reacting yeast. Too much gas developed through holding is lost when the dough is pumped from the holding hopper to the extruder head. Yet, enough holding time (age) for the dough is necessary for its proper performance on the processing line. Too much or too little age renders the product unacceptable. Two to fifteen minutes, depending on the formulation, is the optimum.

Step III

The dough is extruded onto a conveyor where it is sheeted to a 36" width having a thickness of $\frac{1}{8}$", and then through a cutter to yield, upon circular cutting, a raw weight of 6.0 oz. per 9.75" to 10.375" diameter dough piece. The dough sheet, prior to the circular dough pieces being cut, is dusted, with flour on top and preferably with starch on bottom, a minimum amount as required to avoid sticking. Scrap dough is returned to the hopper where it is recycled into fresh dough.

Step IV

Sequentially, the dough pieces are proofed by steaming at 110°-160° F. for one to two minutes (90% plus relative humidity), by Step IV. Dough enters the proofer at 80°-86° F. and exits therefrom at 80°-112° F., never to exceed 112° F. As a result of proofing, the dough piece, by visual estimate, appears to have gained 50% in volume, which can be lost by handling, as by manually lifting off the conveyor. The dough is cool enough at the end of proofing so as to be no longer sticky.

Step V

The proofed dough pieces, while at a temperature of 80°-112° F., and having dimensions of 3/16" thickness plus, approximately 9.75 to 10.375" diameter, and weighing about 6.0 oz., are conveyed to the submersion fryer, whereupon they are confined between top and bottom chain conveyor belts, that move in horizontal, parallel planes spaced approximately 3/16" apart at vertically aligned proximate points, which immerse the dough pieces just below the surface of the liquid frying medium, and advance them without tearing by maintaining no relative movement between the two belts and the dough pieces. The dough pieces are submerged in the frying bath to a depth of one-half to two inches until reaching a very pale brown color which contemplates a travel time through the bath of about 40-50 seconds at a bath temperature of 360°-410° F.

Between the vertically aligned proximate points of the adjacent belts, which shall be referred to as "compression areas," the dough pieces are held demobilized until the dough confined within the compression areas is cooked throughout the dough section into a set, stable, homogeneously integrated mass of relatively solid, non-laminated, character, while the dough in areas adjoining the compression areas, which areas are interstitial, and relatively non-confining, is allowed to respond to gases generated and expanded within the dough as the heating progresses to form delaminating blisters and lesser bubbles of controlled, preselected or random design and orientation.

The bottom conveyor belt is of relatively flat-flex weave, imparting a slightly corrugated configuration to the fried dough, while the top conveyor is a balanced weave design so as to impart the desired characteristics to the dough noted above.

Crusts emerging from the oil bath having the following specifications:

Crust height = $\frac{7}{8}" \pm \frac{1}{4}"$
Dimensions = $10" \pm \frac{1}{4}"$
Fried crust weight = 5.75 ounches ± 0.25 ounce
Frying loss = about 2%
Fried crust moisture = 25.5% ± 2.5%
Fried crust fat = 8-16%

The product dough section results in an attractive aperture-free crust, the upper surface of which is not uniformly blistered and the lower surface of which is uniformly flat and corrugated slightly.

General Comment

The cut dough pieces, before proofing, have a formula water content of about 33%, which is increased slightly after proofing by surface water from steaming. After frying, there is a 8-14% water loss that is replaced by fat. The formula fat content of 0.9%, thus, becomes 8-16% after frying.

During sustained productive conditions, the fat-content of the final product should level off at 10-12%, preferably lower, in the interest of quality and cost, and so that shelf life of the product may be as long as possible.

In this regard, the cooking oil temperature may be maintained at close to 360° F.-410° F. Above this, the oil starts to break down. Below this range, the product tends to imbibe too much oil. Within these parameters, the dough pieces should be fried as hot as possible for approximately 40-50 seconds. The product should be submerged one-half to two inches below the surface of the oil bath, which is the hottest zone of the most uniform temperature. Deeper immersion seems to prevent optimum bubble formation in the crust, presumably due to increased pressure, while less immersion becomes too close to the surface of the oil, and some effect is lost.

Convection currents, plus conveyor movement, cause the heated oil to circulate around the bath up and down, vertically, adjacent the ends, and horizontally lengthwise of the bath, the top zone being counter flow to the bottom zone. This and optimally disposed counter moving conveyor causes crumbs and particulate matter to migrate to the relatively colder, deeper end, where they are continuously removed from the bath.

The movement of the crusts through the oil causes the latter to exert a wiping action along the bottom of the crusts so as to purge any unwanted excessive gases and steam vapor that might otherwise tend to collect. An impeller, baffle or rotary brush can supplement this function if required to prevent an uneven indented bottom on the product.

BRIEF DESCRIPTION OF THE DRAWINGS

The embodiments of a preferred frying apparatus for continuously producing fried dough products, are depicted in the accompanying drawings in which.

DESCRIPTION OF PREFERRED EMBODIMENTS

Figure 1:
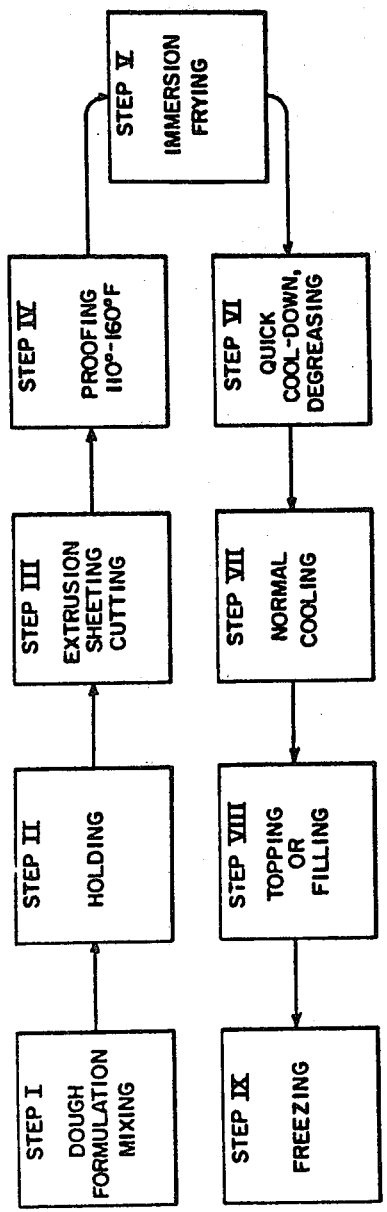
FIG. 1 is a schematic flow diagram of a processing sequence in accordance with a preferred embodiment of the present invention.

The flow-diagram of FIG. 1. schematically depicts steps I–IV, previously described in some detail. Also shown are the novel frying and rapid pre-cooling and degreasing steps V and VI, and the more coventional cooling step VII, filling or topping step VIII, and freezing step IX.

Figure 2:
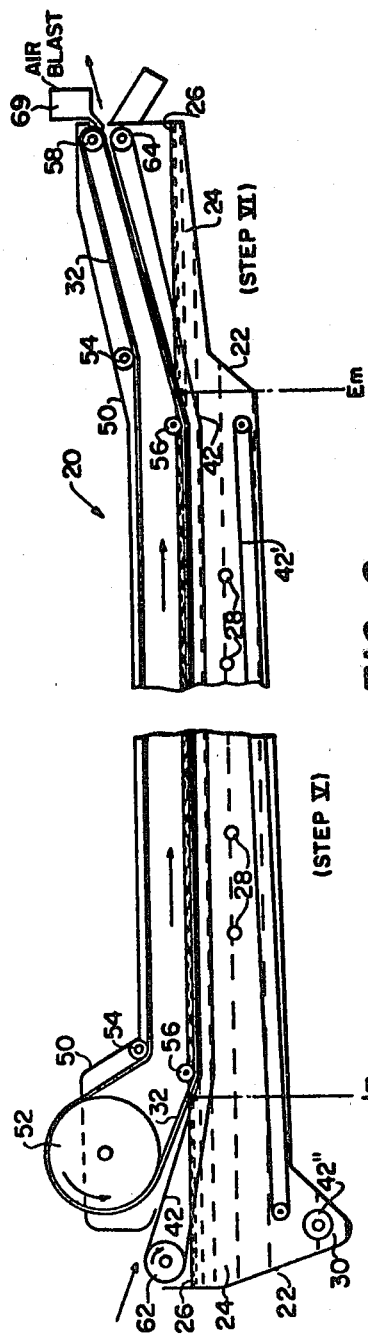
FIG. 2 schematically depicts apparatus used at Step V in FIG. 1 as that part of the production line, wherein the product is fried, and at Step VI, where it is subjected to rapid pre-cooling and degreasing by airblast.

Step V is accomplished with the fryer apparatus 20, schematically shown in FIG. 2. An elongated tank 22 is horizontally supported by supporting means (not shown) to sustain a bath of cooking oil, or other suitable liquid, 24, at level 26. Transverse heaters 28 are immersed on co-planar horizontal axes at about mid-depth within the oil bath to provide the oil with a temperature gradient above the plane of the heaters 28 that affords a uniform temperature surface layer 1½" to 2" deep beneath the surface level 26 of 360°–410° F. Beneath the plane of the heaters, the temperature gradient lowers to a "cold zone" at the bottom of the tank.

Particulate matter set adrift, is moved mechanically toward the deeper end, cold-well or trap 30, into which the bottom of the tank slopes.

Two belt conveyors 32 and 42 are associated with the tank 22 for immersion in and travel through the oil bath 24 within it. In the schematic depiction of FIG. 2, the belts are between 35" and 36" wide, are woven of stainless steel wire, and, though driven coordinately to enter, travel through, and emerge from the oil bath at the same linear velocity, they are tensioned and adjusted independently of each other.

A sediment removal belt 42′ of flat flex construction is mounted adjacent the bottom of the tank 22 in its cold zone. This transports crumbs in counterflow movement to well 30 at the feed end of the tank where auger 42″ moves it to a drain and finally to a filter.

Figure 4:
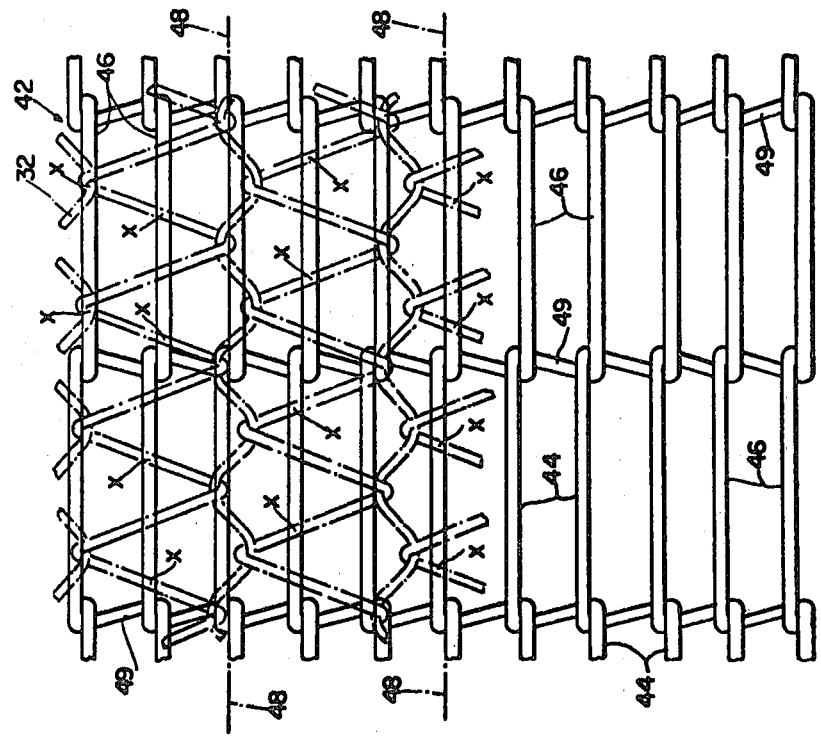
FIG. 4 is a fragmentary plan view of the lower, flat-flex conveyor belt used in the apparatus of FIG. 2, over a portion of which, the conveyor belt of FIG. 3 has been superposed in phantom lines.
Figure 3:
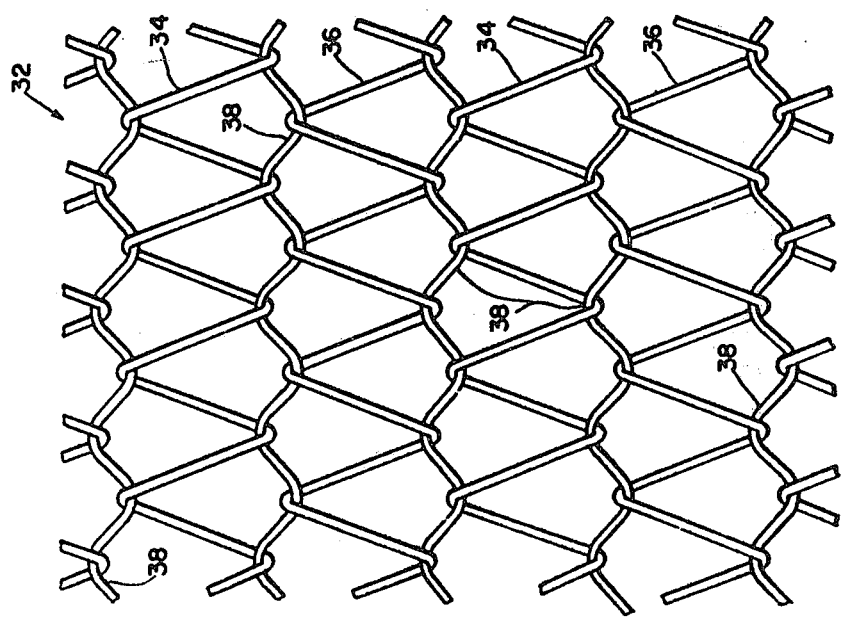
FIG. 3 is a fragmentary plan view of the upper, balanced-weave conveyor belt used in the apparatus of FIG. 2.

The top conveyor belt 32 is known in the trade as a balanced-weave belt, a planar fragment of which is illustrated in FIG. 3, while the bottom conveyor belt 42 is known as a flat-flex belt, correspondingly shown in FIG. 4. Both figures are to the same scale, as drawn. The balanced-weave belt 32 is formed of flattened righthand helices 34, alternated with flattened lefthand helices 36, both sets of helices having a pitch length of one-inch, as shown. The helices are held together by crimped, transverse wire connectors 38 on 1.25 inch centers. This belting bears the manufacturers designation of "B-12-10-12": "B" for balanced, first "12" for number of helical turns (pitches) per foot of width, "10" for number of crimped connectors per foot of length, and the second "12" for wire gauge throughout. (12 gauge=7/64 or 0.109 inch diameter). The assembled belt is 17/32 (0.532) inches thick. Both the right and left-hand helices, as viewed in FIG. 3, are flattened to dispose their respective proximal wire turns essentially tangent to a common plane.

The flat-flex lower belt 42 is an assemblage of transverse wire elements 44 of the same, or slightly smaller, gauge as the balanced-weave belt, each of which is identically formed into a series of two dimensional offsets to permit them to be interconnected, as shown, to dispose their preponderating transverse portions 46 contiguous to common transverse axes 48 and nominally tangent to a common plane. The shorter longitudinal components 49 are conformed in two dimensions for mutual accommodation in the configuration of FIG. 4, that can readily flex around support rolls or sprockets, while being flat, stable, and capable of sustaining the planar relationship under tension without sagging in the intended use.

A preferred manner of associating the belts 32 and 42 in cooperative relation with each other for the purposes of the present invention will now be described with reference to FIG. 2:

The upper conveyor 32 is mounted on a unitary horizontal frame 50, only one side of which appears in the schematic drawing, in which are journalled a power input roll 52, upper guide rollers 54, lower guide (submersion) rollers 56, and an exit-end roller 58, the latter of which may be adjustably secured to impart the requisite operating tension to the balanced-weave conveyor belt 32. As viewed in FIG. 2, movement of the lower flight of the upper belt between the lower roller 56 is from left to right, and is supported against sagging between the rollers 56 by transverse bars (not shown) at spaced longitudinal intervals that are incorporated in the belt design, which engage and travel on horizontal tracks (not shown) extending along each side of the mounting frame 50 near the oil bath level 26 immersion line. The lower face of the belt 32 is, thus, maintained with all of the adjacent helical half-turns disposed in nominal tangential relationship to a common horizontal plane, that is parallel to the level 26 of the bath oil, throughout its flight through the bath 24 between the submersion rollers 56.

The entire upper conveyor assembly in the frame 50 can be raised and lowered as a unit by hydraulic jacks or screws (not shown) to allow for micrometric adjustment in the depth of immersion beneath the bath oil surface, and in relation to the confronting flight of the lower conveyor 42. The same means allows the upper conveyor unit to be raised a substantial distance for servicing of the equipment.

The lower flat-flex conveyor belt 42 is tensioned between a horizontal drive-roll 62 at the lefthand (entering) end of the assembly, as viewed in FIG. 2, the drive of which is coordinated with the upper drive roll 52 for uniform inter-belt speed, and an exit-end roller 64 that is adjustably-mounted to regulate the tension of the lower belt. Both roll 62 and roller 64 are carried by mounting means associated with the conveyor frame 50 so as to be stationarily fixed with respect thereto.

In between the roll 62 and roller 64, lower belt 42 is supported in its forward (upper) and return (lower) flights by cross-bars (not shown) secured to the inside surface of the endless belt at six foot longitudinal intervals. The cross-bars, at their extremities, engage longitudinal tracks or guides (not shown) extending horizontally along opposite sides of the conveyor frame 50 in confronting relation, so as to retain the upper flight of the belt adjacent the surface of the oil bath in level planar relation thereto as it moves between the lines of immersion and emersion with respect thereto. The lower conveyor, thus, provides a stable, level, movable platform that is fixed in its overall position as regards both the tank 22 with which it is associated, and the level of bath oil disposed within it.

As shown in FIG. 2, the two conveyors 32, 42, are disposed in cooperative relationship to each other. This parallel relationship in the bath and to a degree after the bath, fixes the dough pieces in a horizontal plane as against the buoyancy of the dough pieces during frying. Roller 52 is driven (counterclockwise as shown) to cause the balanced-weave belt 32 to enter the bath 24, and move therethrough barely beneath and in parallel relation to such surface between the submersion rollers 56, thence, upwardly and outwardly from the bath around end-roller 58, segue beneath upper rollers 54, back to power roll 52.

The lower flat-flex belt 42 is driven downwardly by driven roller 62 (turning in a clockwise direction as shown) toward the bath, which it enters in covering relationship to the upper belt 32, passing beneath the latter in a position of preselected clearance and parallel movement with it. The clearance between the belts, as they move at the same linear velocity through the bath, may vary between $\frac{1}{8}''$ to $\frac{3}{8}''$, with a preferred setting for the examples given of 3/16" spacing.

Dough pieces (not shown) emerging from proofing at Step IV, while at a temperature near 80°–112° F., are immediately fed onto conveyor 42 in the direction of the arrow at the lefthand end of the fryer assembly, FIG. 2. The dough pieces enter between the upper and lower belts, all moving at the same speed in the same direction, in avoidance of relative movement, and are immersed in the oil bath at line Im to a depth of 1" to 2" over the top surface of the dough. Upon entering the bath, surface water from proofing that has condensed on the dough is instantly evaporated, and the cooking starts. The bath temperature is at 360°–410° F. within the cooking zone near the surface of the bath, as previously noted, and the travel time in the bath, from immersion point Im to emersion point Em is 40–50 seconds. Eight-fourteen percent of the formula water is lost during submersion in the oil, and some of the latter is imbibed by the crust in its place. Water loss or retention is controlled through immersion time and bath temperature, the lesser of both affording the greatest retention of water and the least imbibition of fat, and vice versa, except that fat transference not due to water displacement is curtailed by higher temperatures over a lesser period of time.

The dough pieces are confined between the belts, and their increase in volume, due to leavening gas pressure from within, is more of an upward development into the larger, more open mesh of the upper balanced-weave belt 32, than downward into the more supportive flat-flex belt 42, although some corrugating effect of the latter is imprinted on the bottom crusts after cooking. Because the longitudinal spacing between crimped connectors 38 of the balanced-weave belt 32 is $1\frac{1}{4}''$, and that of the transverse components 46 of the transverse links 44 of belt 42 is $\frac{1}{2}''$, the longitudinal placement of the one is constantly changing with respect to the other as they move along together, even though both are traveling at the same speed. Add to this the variable of the right- and left-hand flattened helices that alternate in opposite directions (between the eleven o'clock and one o'clock positions, as viewed in FIG. 3), and there develops an ever-changing, unpredictable pattern in the location of the cross-over points of the closest spaced elements between the two belts. For instance, if the top belt 32 were lowered until it touched the lower belt 42, the points of tangency between the adjacent upper elements 34, 36 and the lower elements 44 define the cross-over points designated X in FIG. 4. These points shift among on-coming links as the belts continue to move due to lack of registration between the two designs, so as to give a random placement of the cross-over points. The X-points of FIG. 4 were derived from overlaying a tracing of FIG. 3 upon the design of FIG. 4, and marking the points of tangency.

In terms of the dough pieces, and finished crusts derived therefrom, these X- or cross-over-points are those wherein the dough is most closely confined, wherein it is required to maintain its raw thickness and homogeneity, forcing leavening gases to be displaced sidewise into adjacent, less confined areas.

Figure 5:
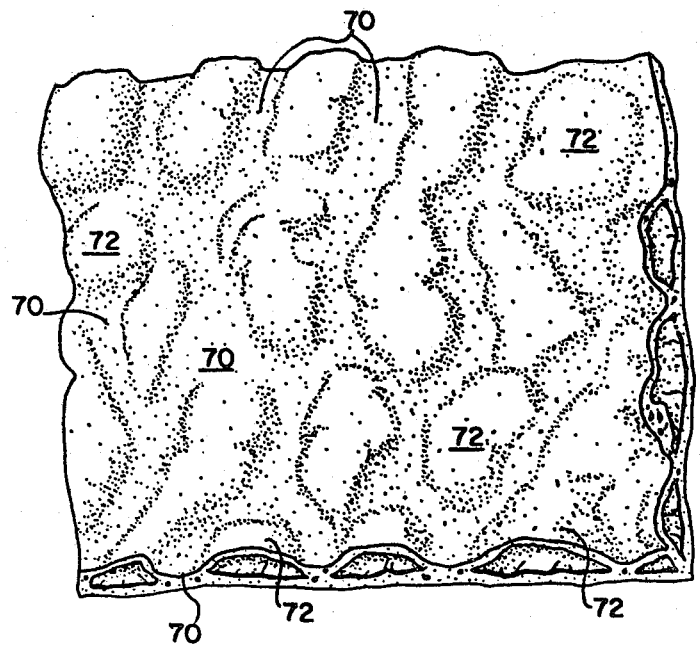
FIG. 5 is a fragmentary part plan, part perspective view of a typical crust made by the present invention, as seen from above.
Figure 6:
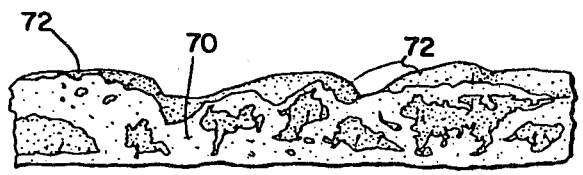
FIG. 6 is a cross-sectional view taken randomly across the crust shown in FIG. 5, enlarged approximately two times.

As the external surfaces form into hardened crusts on the top, bottom, and edges of the dough pieces, the compact dough in the cross-over areas, being at its thinnest point, bakes into a stable bread column that bonds the top and bottom crusts into a unified structure that resists delamination. The cross-over points, thus, become bonding points of homogeneous dough cum bread. These points are indicated in a few instances at 70 on the crust depicted in FIG. 5, of which FIG. 6 is an enlarged cross-section. In between such points, corresponding generally to the interstitial pattern of the upper belt 32, are the zones of expanded volume, representing bubbles, blisters, or hollow domes 72, randomly occurring across the topography of the crust. In between both the cross-over points 70 and the elevations 72, might be found lesser depressions, that correspond generally to the tread of the right- and left-hand flattened helices 34, 36, within which only limited delamination has occurred.

The conveyor belts 32 and 42, FIG. 2, from their line of emersion Em from the oil bath 26, are projected from the bath at the same critical spacing to maintain confinement of the dough pieces until sufficiently cool to reduce the pressure differential between gases within the product and that of the ambient atmosphere to a value where delamination will not occur. As the dough crusts emerge from the bath, oil at bath temperature is entrained upon them to prolong the cooking outside of the bath. Were the crusts to be released from confinement upon emergence, expansion due to continued cooking would allow an unacceptable amount of delamination to transpire. Confinement is, therefore, provided for the dough pieces continuously through the bath and beyond the emersion point Em to the roller 58, at which point the upper belt 32 separates from the lower belt 42 and proceeds on its return flight.

Positioned at this point or line, is one or more air-jets 69 designed to deliver high velocity air upon the merging crusts to accomplish three things:

(1) Rapidly to pre-cool the crusts to a temperature at which gas pressures within and without the crusts attain or approach equilibrium, in avoidance of delamination;

(2) Exert a forceful wiping action upon the crusts, whereby excess oil entrained thereon and its attendant cooking action, will be effectively eliminated; and (3) Exert a stripping action upon the crusts, some of which, by virtue of protruding into the mesh of the upper belt, will tend to follow it in its course around roller 58. The air blast will force the crusts away from belt 32, and allow them to continue on with the lower belt 42 to their point of discharge to the normal, slower cooling of Step VII.

The apparatus of Steps V and VI and related operating conditions, contemplate a tank (22) 30½ feet long by 37 inches wide, with an immersion zone (distance between Im and Em, FIG. 2) of 26½ feet. With a prescribed immersion time of 40–50 seconds, at bath temperatures of 360°–410° F., the crusts, to be immersed 45 seconds, must traverse the 26½ feet beneath the oil at the rate of 0.58 feet/second, confined between belts moving at 34.81′ (feet)/minute. At 55 seconds, the crust must move at 0.48″/second, with the belts traveling at 28.8′ (feet)/minute. Step VI, the preliminary rapid cooling down, with air blast, is accomplished in 2 to 3 seconds. At belt speed averaging ½ foot/second, the confining conveyor from emersion point Em to roller 58 must be at least one to one and one-half feet in length.

It will be seen from the foregoing that novel means are utilized to produce a superior crust product, in which the wasteful practices of too much uncontrolled leavening too early that necessitated perforating or docking the dough, are eliminated, in favor of controlled leavening through the use of both moisture responsive and time-responsive leavening agents in formulation, and through the subsequent time-temperature relationships in the handling of the dough to final cooking. The optimum crust is realized from this dough held in confinement during cooking to afford just the right amount of delamination and volume development in the shortest possible time in an immersion fryer, and, thereafter, until internal gas pressure equals ambient pressure.

We claim as our invention:

1. Apparatus for continuously producing fried dough crusts that includes means for retaining an elongated bath of oil, a pair of endless conveyors traversing a part of said bath beneath the surface of the oil in uniform, spaced, parallel relation to each other, the spacing between the conveyors being maintained within the range of ⅛″ to ⅜″ for the confinement of dough pieces therebetween, the path of traverse of said conveyors demarking the cooking zone within the bath, means for maintaining the oil in the cooking zone at temperatures of about 360°–410° F., means for continuing the confinement of the crusts beyond the bath to a delivery point, and means for rapidly cooling the crusts before reaching said delivery point, and in which one of the conveyors is above the other, the upper conveyor being of balanced-weave construction, the lower conveyor being of flat-flex construction, the designs of said conveyors being incapable of registering with one another.

2. The invention of claim 1, in which the rapid-cooling means is high velocity air jet means positioned to cool the product, wipe off superficial oil therefrom, and to aid in the stripping of the product from the confining conveyors at the delivery point.

* * * * *